US008882463B2

(12) United States Patent
Pasetto

(10) Patent No.: US 8,882,463 B2
(45) Date of Patent: Nov. 11, 2014

(54) TURBO-MACHINE WITH BLADE WHEELS

(76) Inventor: Piergiorgio Pasetto, Bolzano (IT)

( * ) Notice: Subject to any disclaimer, the term of this patent is extended or adjusted under 35 U.S.C. 154(b) by 877 days.

(21) Appl. No.: 12/737,621

(22) PCT Filed: Jul. 29, 2009

(86) PCT No.: PCT/IB2009/006402
§ 371 (c)(1),
(2), (4) Date: Mar. 16, 2011

(87) PCT Pub. No.: WO2010/013126
PCT Pub. Date: Feb. 4, 2010

(65) Prior Publication Data
US 2011/0262268 A1 Oct. 27, 2011

(30) Foreign Application Priority Data
Jul. 30, 2008 (IT) .................. BZ08A0030

(51) Int. Cl.
*B64C 11/00* (2006.01)
*F01D 1/24* (2006.01)
*F03B 17/06* (2006.01)

(52) U.S. Cl.
CPC .............. *F03B 17/065* (2013.01); *Y02E 10/28* (2013.01)
USPC .................. 416/111; 416/128; 416/170 R

(58) Field of Classification Search
USPC ........................ 416/111, 108, 126, 128, 130
See application file for complete search history.

(56) References Cited

U.S. PATENT DOCUMENTS

| 1,584,810 | A | * | 5/1926 | Sargent ........................ 416/121 |
| 2,603,300 | A | * | 7/1952 | King ............................. 416/10 |
| 5,324,164 | A | | 6/1994 | Doering |
| 5,825,108 | A | * | 10/1998 | De Filippis ................. 310/67 R |
| 2009/0010761 | A1 | | 1/2009 | Schiel |

FOREIGN PATENT DOCUMENTS

| WO | 85/01780 | 4/1985 |
| WO | 2004/074680 | 9/2004 |

* cited by examiner

*Primary Examiner* — Edward Look
*Assistant Examiner* — Michael Sehn
(74) *Attorney, Agent, or Firm* — Jacobson Holman Hershkovitz, PLLC.

(57) ABSTRACT

A turbo-machine with blade wheels, comprises a body, a rotor which is held in a rotatable manner by the body, at least two rotatably arranged blades which are distributed uniformly along a circular line of the rotor and which are mounted with their axis parallel to the axis of the rotor, transmission members between each axis of the blade and a sleeve which is rotatable on the shaft of the blade wheel. The first rotor is assigned a second rotor which is held in a rotatable manner by the first rotor, wherein the second rotor comprises at least two rotatably arranged blades which are distributed uniformly along a circular line of the rotor and which are mounted with their axis parallel to the rotor, transmission members between each axis of the blade and the sleeve which is rotatable on the shaft of the rotor.

12 Claims, 6 Drawing Sheets

TURBO-MACHINE WITH BLADE WHEELS

This is a national stage of PCT/IB09/006402 filed Jul. 29, 2009 and published in German, which claims the priority of Italian number BZ2008A000030 filed Jul. 30, 2008, hereby incorporated by reference.

The present invention refers to a fluid dynamic machine with blade rotors according to the identifying section of claim 1.

Machines of this type are known, particularly based on the patent for the industrial invention number 1 345 097, filed on 15 Sep. 2003.

In this patent a mechanism is described in which the fluid is orthogonally intercepted, with respect to the axis of a rotor, by blades which are continuously adjustable through the appropriate adjustment intervention. Hence, the kinetic energy contained in the fluid, for example water, can be intercepted and captured by the blades with the full surface of such blades in an orthogonal position with respect to the fluid flow and the blades not being in fixed position, such blades during their rotation around the rotor axis are a minimum obstacle for the fluid flow when they do not generate any moment or only negative moment. Hence, according to the density and the physical-chemical characteristics of the fluid, as well as the desired energy, the blades and the rotor are appropriately sized.

With such a mechanism, the same applicant has found out that various aspects of a mechanism of this type can be improved in order to obtain better results again.

The object of the present invention is therefore to provide a fluid dynamic machine wherein the kinetic energy of a fluid can be optimally exploited with maximum efficiency.

This object is achieved according to the invention by a fluid dynamic machine with the characteristics of the claims.

According to the invention, a fluid dynamic machine that can be assimilated to reaction slow turbines of the "cross-flow" type is envisaged, with the axis orthogonal to the direction of the fluid flow, working with two (or more) coaxial and concentric rotors.

The machine is built in order to intercept and capture the maximum amount of kinetic energy from the fluid flow (water, air) in which it operates. Each rotor consists of a rotating circular body and has a number of blades (two or more) arranged and usually equidistant on a virtual circumference, whose diameter is taken as primitive diameter of the rotor. The blades on each rotor are identical and symmetrical and each of them can be rotated on its rotation axis parallel to the central axis of the machine, with 360° movement in both directions.

The rotation of the blades around their individual axis is organised by a series of mechanisms (the most different and common mechanisms known in the art) which ensures the accurate angular positioning of each blade with respect to the others, to the rotor supporting them, and to the direction of the fluid flow.

The mechanical connections of the motions can be freely chosen according to the design needs, as long as the motion ratios between the rotors and the blades are respected. This is performed with an orientation of the blades designed to better capture the kinetic energy in the fluid and according to the position adopted moment by moment during the rotor rotation. The movement is harmonic and without oscillations or tilting since it is always actuated in the same direction and with the same speed which are proportional to the rotor rotation, even when the steering or manual control does not intervene in the adjustment. The blade rotation is arranged so as to perform a 180-degree turn around its axis and anti-clockwise with respect to the current rotation direction of its rotor, which at the same time performs a complete 360-degree rotation around its central axis. This applies contemporaneously to all the blades involved on the primitive circumference of the same rotor and so on for every turn.

The two rotors between each other are preferably a counter-rotor with respect to the other, and the same applies for the motions of the respective blades. This contributes towards cancelling out the resulting torsion which would tend to make the machine assembly rotate with respect to the supporting base, as well as compensating other mechanical frictions which would affect the steering sensitivity. These things would happen if a single rotor was adopted.

The angular rotation speed of the rotor with the greater diameter is normally lower with respect to that with a smaller diameter, in order to maintain more or less the same peripheral speed which is proportional to the fluid speed during flow or travel. The angular speed of each individual rotor can be (mechanically) free and controlled by the sole impact effects of the fluid onto the blades, or restricted and coordinated by a precise ratio between the two rotors. According to requirements, it is possible to perform a mechanical choice of a free coupling with two force outputs, with a differential or proportionally restricted.

The counter rotation of the two rotors is obtained by the thrust of the fluid on the blades which, according to their position and inclination (already re-set during assembly), capture kinetic energy, translating it into rotation torque and, partially deviating the flow which strikes them, they direct—with improving synergic effect—the fluid onto the immediately subsequent blades between one rotor and the next, until a full journey across the system has been performed. However, during the assembly phase it is possible to create the necessary conditions for one-way rotation of the blades.

The blade shape, despite the fact that it must be symmetrical with respect to its axis, does not necessarily have to have a classic aerodynamic profile, since the leading edge as well as the trailing edge must be identical for the alternation of this role at each turn of the respective rotor. This also implies an extreme variability of drawing 0 of the blade proportions, that is: short and large blades, long and narrow blades and all the possible intermediate options, as long as on the same rotor they are identical and symmetrical. The dimensions of the machine and the rotors, as well as the dimension, shape and number of blades, are proportional to the envisaged power and the physical characteristics of the fluid and environment in which the work is performed. The building materials of the machine are therefore according to the preventive design.

The machine is usually designed for operating with a vertical axis, however, it can be used with any arrangement and angle, as long as the axis remains orthogonal to the fluid flow. The machine can be equipped with steering or another device which senses the fluid direction and acts on the machine input control which is appropriately designed to adjust the blades of both rotors at the same time. It can be combined with a manual control by means of an input differential. The advantage with respect to other machines is that in this way it is possible to easily orient the blades only, even when the machine is at full power and operation, without having to orient the entire assembly. It also makes it possible to intervene in order to slow down, stop and rotate the rotors anti-clockwise with the same efficiency, also under full power of the fluid and without the need to use a brake.

This system is reversible and therefore valid also as an impeller. If, instead of collecting the energy from the output power take-off, a motor or similar is applied, the machine system is used in an inverse way in order to give thrust to the fluid in which it is immersed. Acting on the number of revolutions the force can be determined and acting on the blade adjustment it is also possible to direct the thrust indifferently in any direction throughout 360 degrees. With undoubted advantages of maneuverability, especially in the nautical field, with a central thrust from the axis which is continuous and without vibrations due to the floating blades. Moreover, the rotor being relatively slow, the risk of cavitation is unlikely to incur. The dimensions and proportions, always keeping the same operating concept, are obviously carefully designed according to the use for which the impeller machine—in this case—is intended.

Further characteristics and embodiments will be clear from the claims and the following description of some preferred embodiments, depicted in the attached drawings, wherein FIG. 1 is a schematic axial section of a fluid dynamic machine according to the invention, in a first embodiment, with rotors with restricted mechanical motions, FIG. 2 is an enlarged partial schematic axial section of FIG. 1, FIG. 3 is a schematic axial section of a fluid dynamic machine according to the invention in a second embodiment, with rotors with linked output motions and differential;

Figure 1:
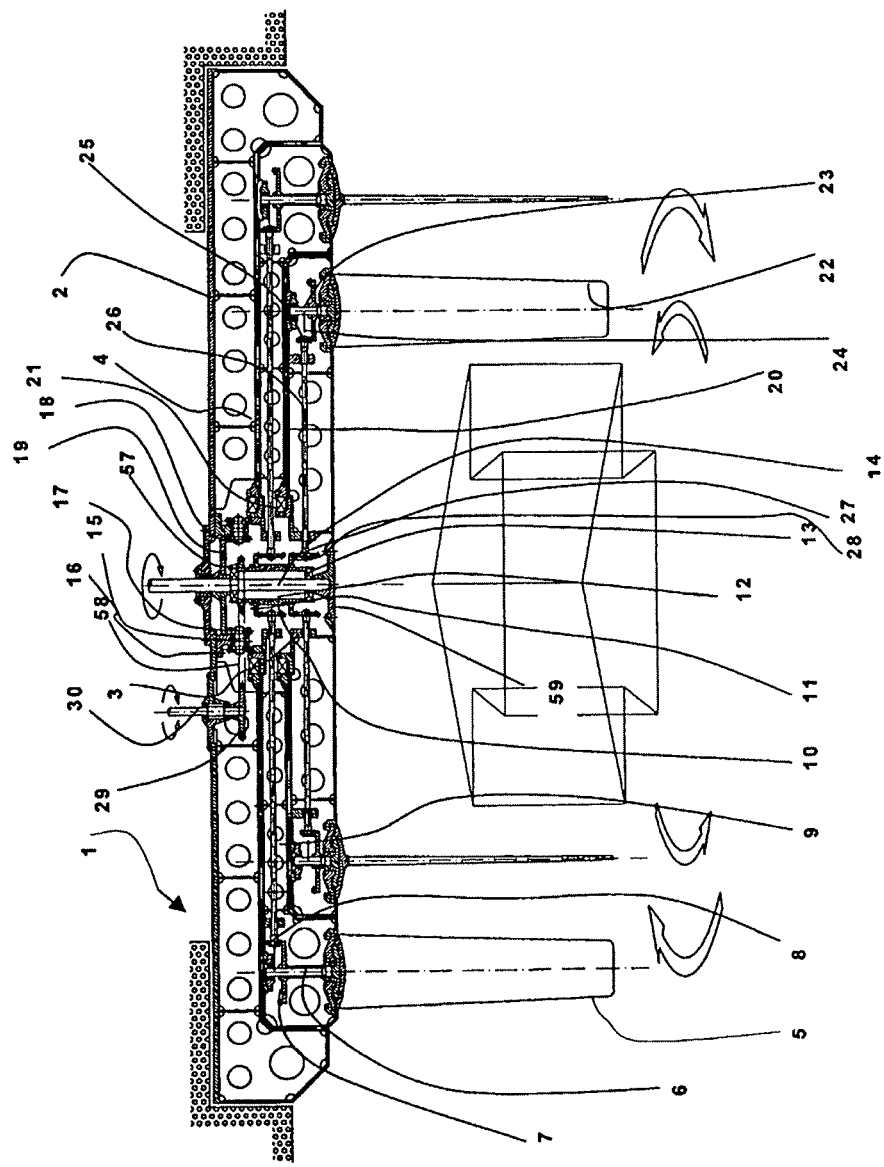

In the Figures, reference number 1 indicates as a whole a fluid dynamic machine according to the invention. It has a base body 2 in which a first rotor 4 is generally housed by means of a bearing 3. Along a circumference from rotor 4, at least two blades 5 are rotatably supported and equally distributed by means of shafts 6 with axes perpendicular to rotor 4. Each rotatable shaft 6 securely supports the respective blade 5 and is equipped with a conical wheel 7 which engages with a respective conical wheel 8 rotatably supported by a rod 9 with perpendicular axis to the axis of the shaft 6 and rotatably supported by rotor 4. Rod 9 supports at its other end a toothed conical wheel which engages with a toothed conical wheel 11 securely supported by a sleeve 12 supported by bearings 13 on a shaft 14 rotatably supported by body 1. Rotor 4 in correspondence with its central hole further supports a conical crown gear 15 with which it engages a pinion gear 16 integral to a shaft 17 rotatably supported by body 1 and with its axis perpendicular to the axis of the crown 15. Shaft 17 further supports a second pinion gear 18 which engages with the front conic toothing of a disc 19 fitted onto shaft 14.

According to the invention, the first rotor 4 is associated with a second rotor 20, rotatably supported by a bearing 21 of the first rotor 4 and supporting at least two blades 22 equally distributed along its circumference, the blades being respectively supported by a shaft 23 rotatably supported by the rotor 20 with perpendicular axis to the same rotor. As for the first rotor 4, also in this case the shaft 23 supports a conical wheel 24, to which it is integral, and engages with a conical wheel 25 supported by a rod 26 rotatably supported by rotor 20 with perpendicular axis to shaft 23 and having at its other end a conical wheel 27 engaging with a conical wheel 28 integrally supported by sleeve 12. The rotor 20 is also non-rotatably connected to shaft 14 by means of its flange 59.

Sleeve 12 supports integrally to itself a chain wheel 57 connected by means of a chain 58 with a chain wheel 29 fitted onto a shaft 30 rotatably supported by body 1. In this way the position of sleeve 12 varies according to the rotation of shaft 30 and therefore the angular position of blade 5 in any position of rotor 4 with respect to the fluid flow.

Figure 3:
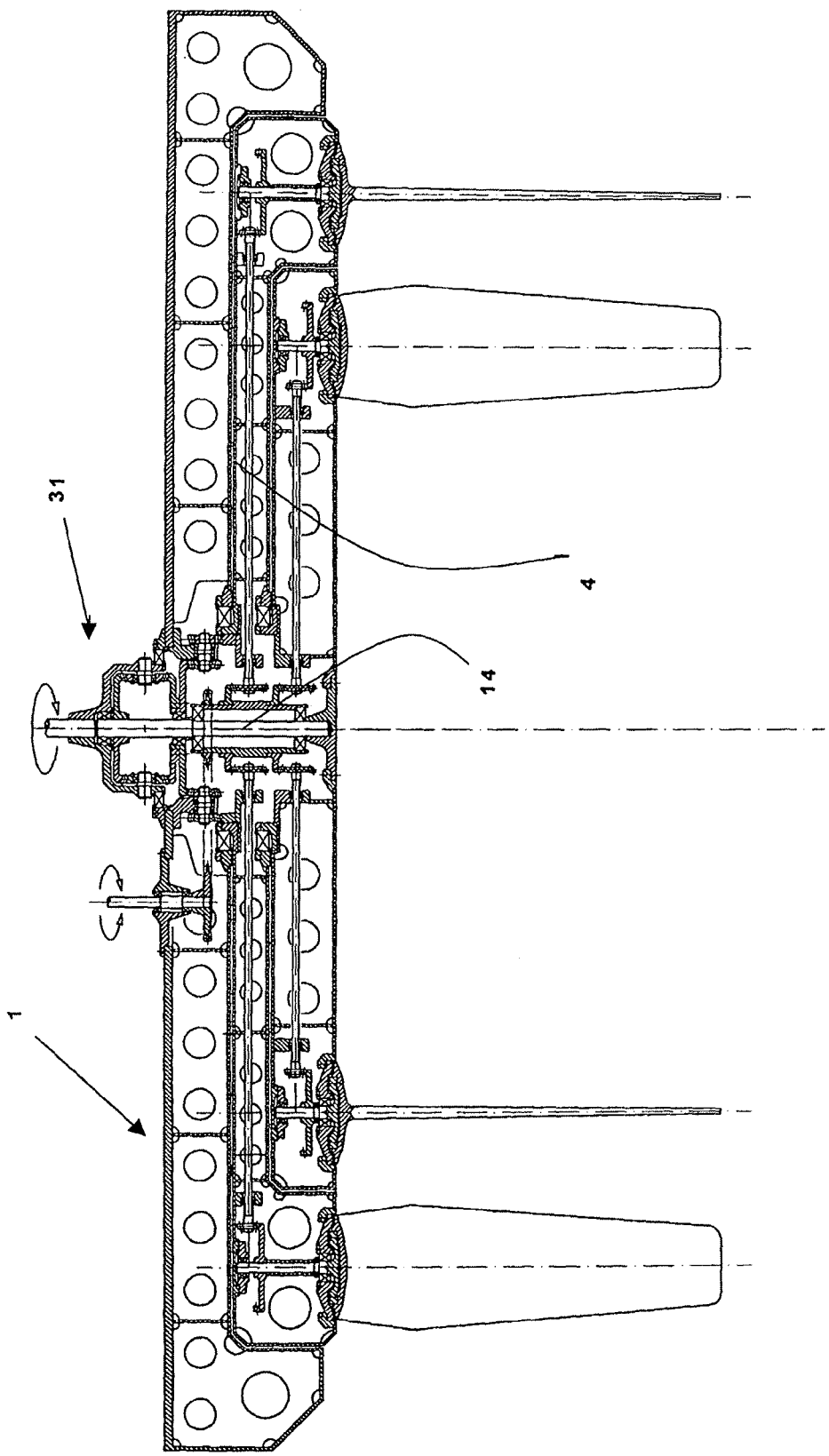
Figure 4:
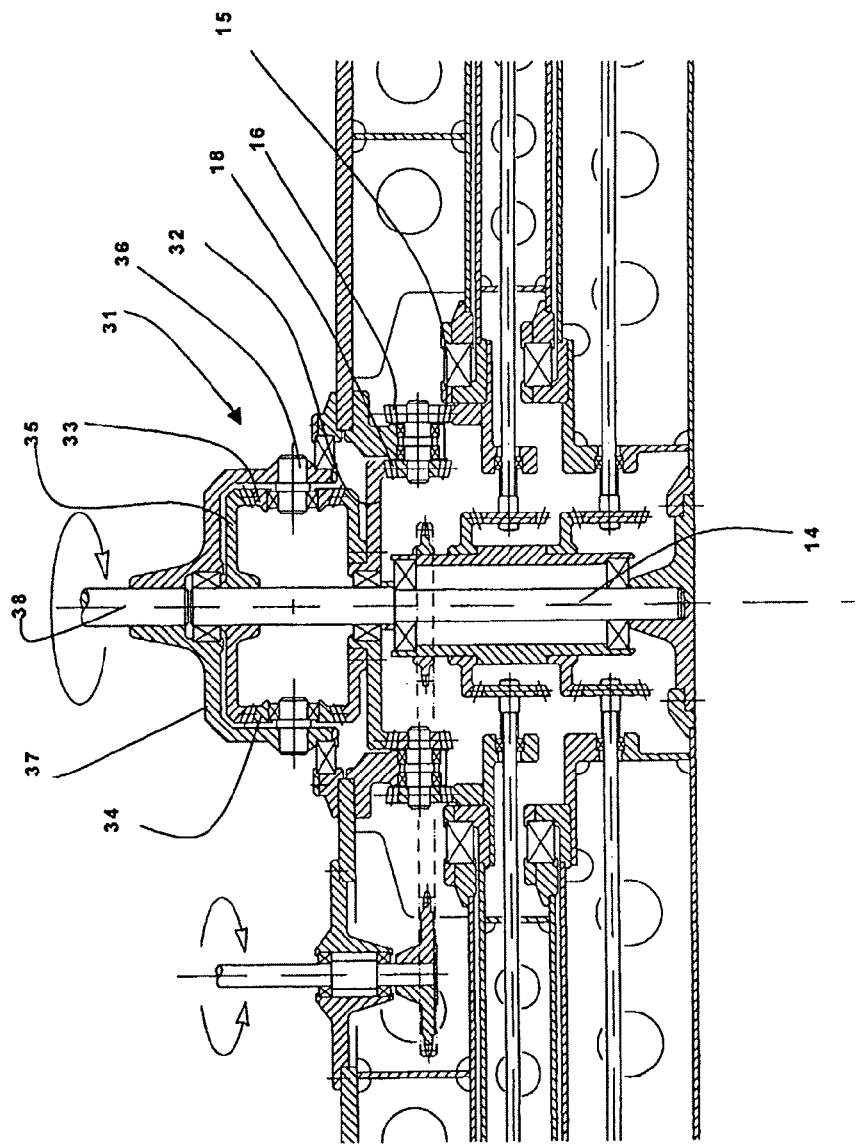
FIG. 4 is an enlarged partial axial section of FIG. 3.

In FIGS. 3 and 4 a second embodiment is depicted, in which the two motions of the first and the second rotors are compensated by a differential indicated as a whole by the reference number 31.

The differential 31 consists of a double crown gear 32 which is rotatably supported by shaft 14 and on one side engages with the first rotor 4 through pinion gear 16 and on the other side with satellites 33 and 34 engaging with a crown gear 35 fitted onto shaft 14 to which the second rotor 20 is rigidly connected. The satellites 33 and 34 are rotatably supported by pins 36 from the wall of a carrier 37 rotatable around shaft 14 and rigidly supporting an output shaft 38. It is clear that the output shaft 38 will serve as a user power take-off.

In this way and through satellites 33 and 34 the motion of the second rotor 20 optimally compensates the motion transmitted by the first rotor 4.

Further characteristics are as follows:

In this way, a fixed base 2 is achieved which structures the whole machine assembly and supports the rotors during operation. It can be applied to a fixed or mobile structure according to the work site.

The first rotor 4, that is the bigger or external one, houses the blade-shafts and their respective movement mechanisms.

The second rotor 20, that is the smaller or internal one, houses the blade-shafts and their respective movement mechanisms.

The bearing 3 forms a thrust bearing for connecting the base to the bigger or external rotor, if the rotors are in a vertical position.

The bearing 21 forms a thrust bearing for connecting the bigger rotor to the smaller or internal rotor, if the rotors are in a vertical position.

The adjustment input shaft 30 is normally stationary and it is directly controlled by the steering, or a similar device or manually.

The connection between the adjustment input shaft and the adjustment sleeve can be obtained instead of by chain 58, by a toothed belt, a toothed wheel or other means as long as the ratio is fixed and free from slipping.

The central adjustment sleeve 12 is normally stationary and can only rotate if controlled by adjustment shaft 30. It supports on itself the two stationary support crowns 11 and 28 of the pinion gears moving the blades both of the external and the internal rotors. Its movement controls the contemporary motion of all the first pinion gears of both the bigger and the smaller rotors.

The wheel receiving control from the adjustment shaft is integral in rotation with the sleeve. The second pinion gear-blade 8 (one on each blade) of the bigger rotor has exactly half the number of teeth of the corresponding first pinion gear-blade. The second pinion gear-blade 25 (one on each blade) of the smaller rotor has exactly half the number of teeth of the corresponding first pinion gear-blade. The crown-blade is integral with the shaft which supports the blade of the bigger rotor. It is moved by the respective second pinion gear-blade and it is therefore subject to being dragged. It has exactly the same number of teeth as the upper support crown of the respective first pinion gears-blades. The crown-blade 24 integral to the shaft which supports the blade of the smaller rotor is moved by the respective second pinion gear-blade and it is therefore subject to being dragged. It has exactly the same number of teeth as the lower support crown of the respective first pinion gears-blades.

The shaft which supports the blade of the bigger rotor can have an attachment system for the blade which can be different according to the known technique.

The shaft which supports the blade of the smaller rotor can have an attachment system for the blade which can be different according to the known technique.

The blade type of the bigger rotor is represented on the left in a flat view (reference number 5) and on the right in a sectional view.

The blade type of the smaller rotor is represented on the left in a sectional view and on the right in a flat view (reference number 22).

Figure 2:
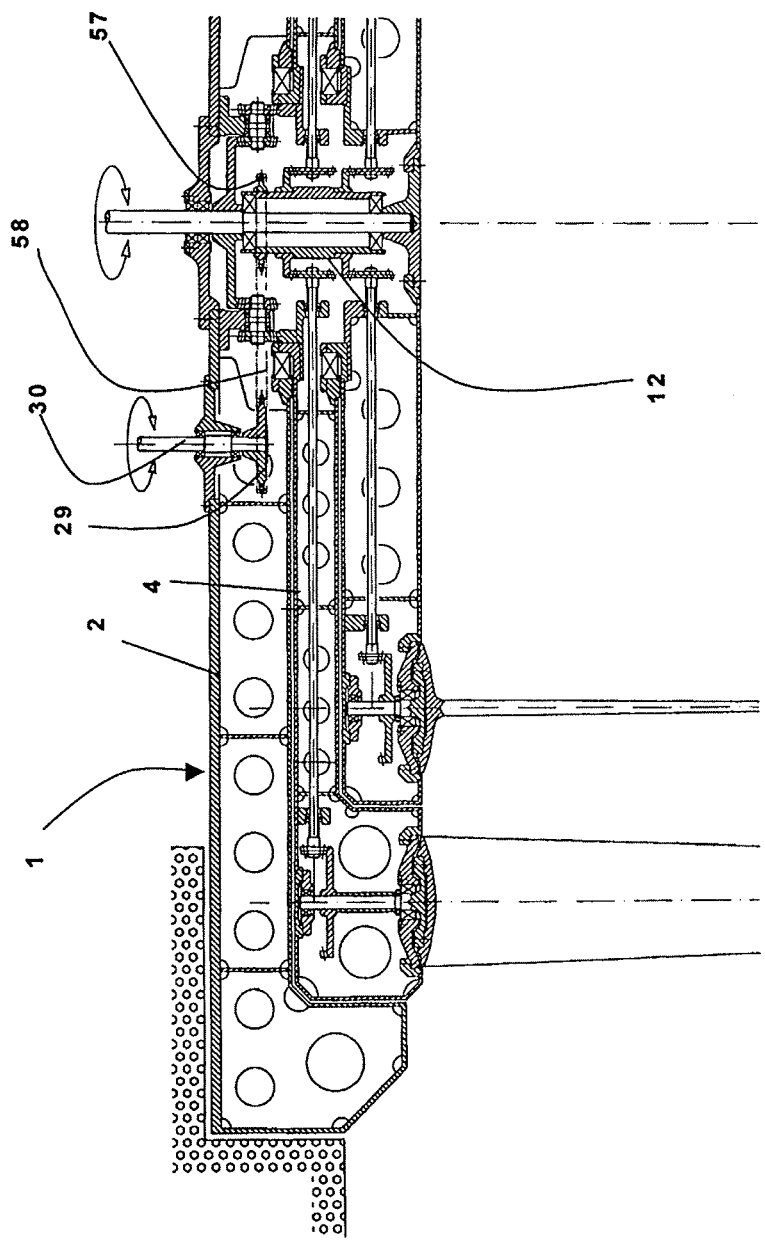

A central connection flange 59 (FIG. 2) between the smaller rotor and the first part of the central output force shaft transfers all the torque generated by the smaller rotor.

The first part of the central force shaft 14 in practice transmits approximately half of the power generated by the machine.

The two satellites 16 and 18 through it are rigidly connected during rotation.

The central crown gear 19 rigidly and proportionally connects the motion between the bigger rotor and the smaller rotor directly onto the second part of the force shaft adding the rotation torque of the bigger rotor to that of the smaller rotor. The teeth ratio between the central crown and the crown integral to the bigger rotor is in proportion to the motions between the smaller rotor and the bigger rotor. With the arrangement shown in the Figure the inversion of the motion from the bigger rotor is achieved and therefore its direction is coherent with that of the smaller rotor.

Embodiment with Output Differential

The double crown gear has a part like 19, but it is not connected to the force shaft, but to another crown transmitting to the latter the torque of the bigger rotor and the direction of the smaller one.

The satellites, engaged and dragged by the first and second crown coherent in direction, rotatably drag in turn the differential body, that is the carrier.

Embodiment with Free Motions

The double crown can be directly connected by means of a sleeve coaxial to the axis of force to an external user. In the same way it is possible to directly connect the central force shaft to another user.

Figure 5:
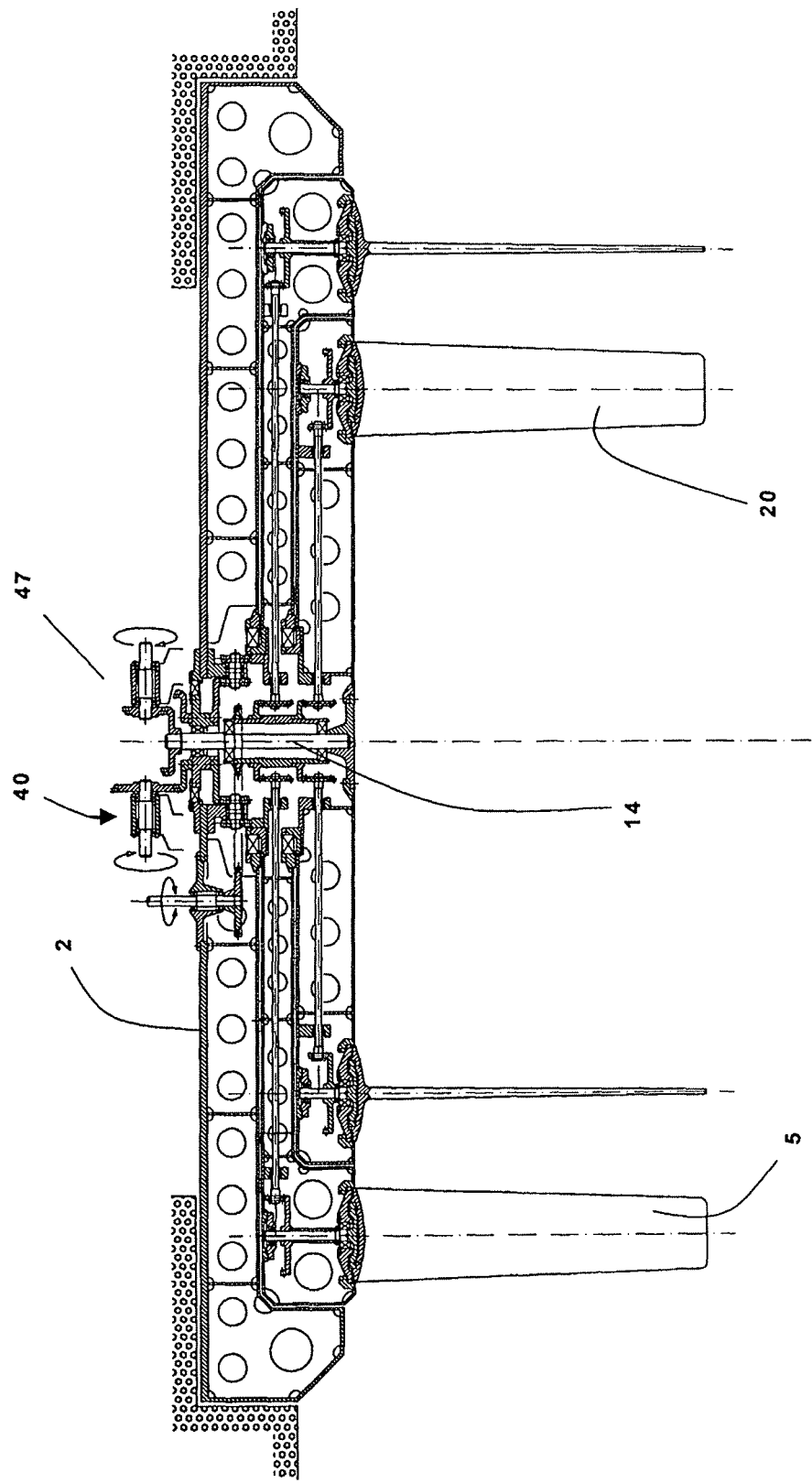
FIG. 5 is a schematic axial section of a fluid dynamic machine according to the invention, in a third embodiment, with a rotor with independent force outputs
Figure 6:
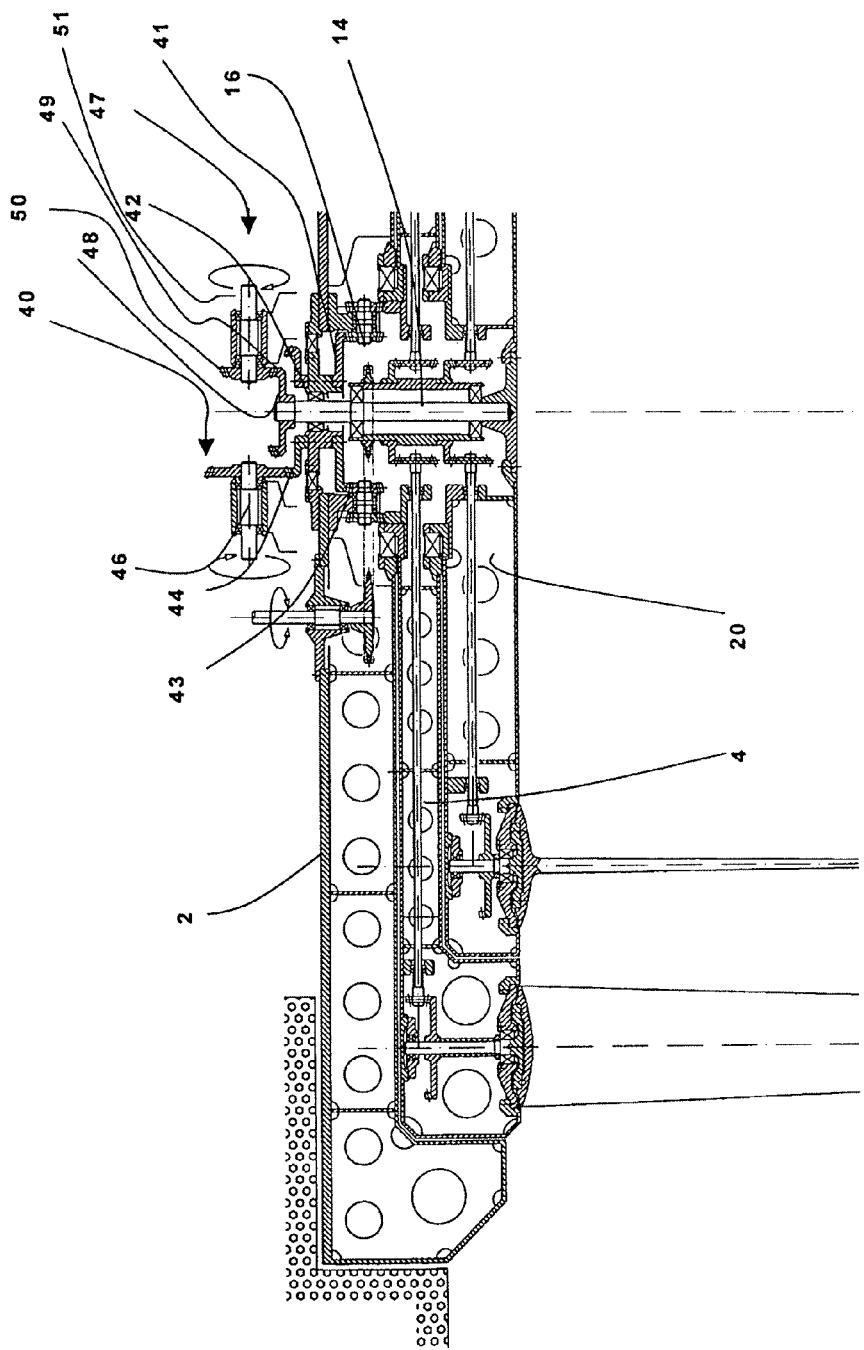
FIG. 6 is an enlarged partial axial section of FIG. 3.

In a third embodiment, represented in FIGS. 5 and 6, a first kinematic mechanism 40 is formed by a double carrier 41, supported by a bearing 42 on shaft 14, having on one side front teeth 43 engaging with the pinion gears 16 and on the other side front teeth 44, engaging with a toothed wheel fitted onto shaft 46 rotating in the fixed structure 2 and adapted as a first power take-off. Moreover, a second kinematic mechanism 47, formed by a carrier 48 fitted onto shaft 14 and engaging its front teeth 49 with a toothed wheel 50 fitted onto shaft 51 rotatable in the base body 2 and adapted to be used as second power take-off. In this way for every rotor, 4, 20 a separate output for different users is envisaged.

The invention claimed is:

1. A fluid dynamic machine with blade rotors, comprising:
a body;
a first rotor rotatably housed by the body, the first rotor being rotatable about a main axis, comprising:
at least two first blades rotatably provided on the first rotor, uniformly distributed along a circumference of the first rotor, each first blade being supported on a respective first blade axle which is parallel to and spaced apart from the main axis, each first blade being rotatable about an axis of said first blade axle; and
first transmission member rotatably connecting each first blade axle to a sleeve rotatable on a power shaft of the rotor;
the first rotor being associated with a coaxial second rotor rotatably housed by the first rotor, the second rotor being rotatable about said main axis, the second rotor comprising:
at least two second blades rotatably provided on the second rotor, uniformly distributed along a circumference of the second rotor, each second blade being supported on a respective second blade axle which is parallel to and spaced apart from the main axis, each second blade being rotatable about an axis of said second blade axle; and
second transmission member rotatably connecting each second blade axle and the sleeve rotatable on the power shaft, so that the angular position of said second blades is rigidly linked to the angular position of said first blades through said first and second transmission members and said sleeve;
and a third transmission member rotatably connecting at least one among said first and second rotors to said power shaft.

2. The machine according to claim 1, characterised in that each of the transmission members is made up of a conical wheel, integral with the axis of each blade by a conical wheel engaged with the latter by a rod holding the latter and rotatably supported by the first rotor or the second rotor by a conical wheel integrally held by the rod and by a conical wheel integrally held by the sleeve.

3. The machine according to claim 1, characterised in that the sleeve is rotatably adjustable around its axis.

4. The machine according to claim 1, characterised in that the sleeve is kinematically connected with a wheel rotatably held by the body and adjustable by using a rudder.

5. The machine according to claim 1, characterised in that the first rotor presents a crown gear engaging with a first pinion gear rotatably held by the body on a perpendicular axis to the axis of the shaft and with a second pinion gear engaging in turn with a crown gear force fitted onto the shaft.

6. The machine according to claim 1, characterised in that the second rotor is force-fitted onto the same shaft as the first rotor.

7. The machine according to claim 1, characterised in that the first and the second rotors are kinematically connected with an output shaft through a differential gear.

8. The machine according to claim 7, characterised in that the differential gear is made up of a double crown gear rotatably held by the shaft and engaging on one side with the first rotor and on the other side with satellites engaging with a crown gear force fitted to the shaft to which the second rotor is rigidly connected, the satellites being rotatably held by a carrier rotatable around the shaft and rigidly holding an output shaft.

9. The machine according to claim 1, whose respective motions of the first and second rotors are also used separately.

10. The machine according to claim 1, characterised in that it is reversible and it can create a thrust in the fluid in which it operates.

11. The machine according to claim 1, characterised in that it can as a whole also work with opposed rotor bodies with the first and second blades being coaxial and concentric.

12. The machine according to claim 1, characterised in that it can as a whole work intubatedly or with a conveyed flow.

* * * * *